UNITED STATES PATENT OFFICE.

HEMAN B. MARSHALL, OF POMONA, CALIFORNIA.

SHEEP-DIP.

SPECIFICATION forming part of Letters Patent No. 306,273, dated October 7, 1884.

Application filed January 7, 1884. (No specimens.)

*To all whom it may concern:*

Be it known that I, HEMAN B. MARSHALL, of the city of Pomona, in the county of Los Angeles and State of California, and a citizen of the United States, have invented a new and useful composition of matter to be used as a wash or sheep-dip for the purpose of curing scab and killing red lice and maggots on sheep, of which the following is a full, clear, and explicit specification, to wit:

My composition consists of the following ingredients, combined in the following proportions, viz: fifty pounds of sublimated sulphur, commonly called "flowers of sulphur," twenty-five pounds unslaked lime, fifteen pounds blue vitriol, (sulphate of copper,) fifteen pounds of Ladd's poison tobacco for sheep-dip, seven and one-half pounds of arsenic, (white, powdered,) three ounces red biniodide of mercury.

The above ingredients are to be all pulverized together except the tobacco. That is put in in the leaf, and then all boiled together in three hundred gallons of water for four hours, and then run into a dipping-vat, to be used milk-warm. This amount will dip one thousand head of sheep when the wool is short. As it gets long it will take more dip. It is to be applied in the usual way of dipping sheep for scab—viz., by holding the sheep in the dip three minutes, and as they are taken out on the dripping-board they are to be well brushed with a coarse hair brush.

I am aware that a portion of the ingredients used in my composition have been heretofore used with other ingredients in the preparation of washes and sheep-dips for scab and foot-rot. Tobacco and blue vitriol, especially, have been extensively so used; but I am not aware and I do not believe that all of the ingredients of my composition, used in the proportions stated, have ever been used together.

By the use of the above composition in the manner stated, all lice and maggots are immediately killed and scab is invariably cured, which result has never before been accomplished by any sheep-wash or sheep-dip heretofore used.

What I claim, and desire to secure by Letters Patent of the United States, is—

The hereinabove-described composition of matter, to be used as a sheep dip or wash for the treatment of scab and for killing red lice and maggots on sheep, consisting of sublimated sulphur, unslaked lime, blue vitriol, arsenic, Ladd's poison sheep-dip tobacco, red biniodide of mercury, and water, in the proportions hereinbefore specified.

HEMAN B. MARSHALL.

Witnesses:
T. W. BEVER,
ELI B. KELSEY.